United States Patent [19]

Boyles

[11] Patent Number: 4,478,303
[45] Date of Patent: Oct. 23, 1984

[54] WEIGHING SCALE

[76] Inventor: Robert L. Boyles, 4C Heritage Sound, Milford, Conn. 06460

[21] Appl. No.: 382,155

[22] Filed: May 26, 1982

[51] Int. Cl.³ .............................................. G01G 3/14
[52] U.S. Cl. ................................................ 177/210 FP
[58] Field of Search ................................. 177/210 FP

[56] References Cited

U.S. PATENT DOCUMENTS

| | | | |
|---|---|---|---|
| 3,565,193 | 2/1971 | Wirth | 177/1 |
| 3,612,198 | 10/1971 | Gallo | 177/210 |
| 3,621,713 | 11/1971 | Wirth et al. | 73/141 A |
| 3,692,128 | 9/1972 | Gallo | 177/210 |
| 3,712,395 | 1/1973 | Streater et al. | 177/210 |
| 3,724,572 | 4/1973 | Saner | 177/210 |
| 3,869,004 | 3/1975 | Gallo | 177/25 |
| 3,885,427 | 5/1975 | Melcher et al. | 73/141 R |
| 3,897,681 | 8/1975 | Meier | 73/141 R |
| 4,147,224 | 4/1979 | George et al. | 177/210 |

*Primary Examiner*—George H. Miller, Jr.
*Attorney, Agent, or Firm*—Leonard J. Platt

[57] ABSTRACT

A weighing scale is provided with a multi-string system stressed in tension and vibrated at its natural frequency for determining the magnitude of a weight applied to the scale. The string system comprises two or more laterally spaced-apart parallel strings that are constrained to vibrate as a unit.

19 Claims, 9 Drawing Figures

WEIGHING SCALE

BACKGROUND OF THE INVENTION

1. Field of the Invention

This invention relates to weighing scales and, more particularly, to household weighing scales utilizing a multi-string weighing system stressed in tension and vibrated at its resonant frequency for determining the magnitude of a weight applied to the scale.

2. Description of the Prior Art

It has been suggested heretofore that the weight applied to a household weighing scale be measured by means of a vibrating string, or wire, system in which a string is tensioned by a weight applied to the scale. The string is then vibrated at its natural or resonant frequency, and means including appropriate logic circuitry and electronic output displays are utilized to sense the natural frequency and convert the sensed frequency into an electronic output display of the applied weight. These systems operate on the well-known principle that the natural or resonant frequency of a string is related in a known manner to the tension force applied to the string.

In the known prior art string systems, a relatively large change in applied weight is required in order to produce an appreciable change in resonant frequency. As a result, both the input mechanism, which converts an actual weight placed on the scale to the tension force applied to the string, and the output mechanism, which senses the natural frequency and converts it into a display of the applied weight, must be extremely responsive to small changes in applied weight and frequency. Moreover, care must be taken in such systems to avoid vibration of the string at harmonic frequencies, which can result in erroneous output readings.

SUMMARY OF THE INVENTION

It is therefore an object of this invention to provide in a weighing scale an improved vibrating string weight sensing system.

Another object of this invention is to provide a vibrating string weight sensing system in which relatively small changes in the applied weight produce significant changes in the natural frequency.

Yet another object of this invention is to provide a vibrating string weight sensing system in which vibrations in undesired modes and harmonic frequencies are substantially prevented.

A still further object of this invention is to provide in a household weighing scale a relatively simple vibrating string weight sensing system that is accurate and stable.

Briefly stated, in carrying out the invention in one form, a weighing scale apparatus having horizontally disposed base and platform members is provided with a force transmitting means for transmitting force between the platform and base members in response to a vertically downwardly directed force or weight applied to the platform member. The force transmitting means includes a string system comprising at least two laterally spaced-apart parallel strings stressed substantially uniformly in tension whenever a downwardly directed force is applied to the platform member, the tension force applied to the string system being related in a known manner to the magnitude of the vertical force applied to the platform member. Means are provided for sensing and indicating the magnitude of the weight applied to the platform member. The sensing and indicating apparatus comprises means for causing the string system to vibrate at its resonant or natural frequency and means for detecting the natural frequency and producing an output signal related in a known manner thereto.

By further aspects of the invention, selectively adjustable means are provided for changing the natural frequency of vibration of the string system in response to a fixed applied weight. The means for causing the string system to vibrate at its natural frequency and the means for detecting the natural frequency include magnetic means secured to the string system, resonant feedback oscillation means cooperating with the magnetic means to drive the string system at its natural frequency, and means for sensing the frequency of oscillation of both the resonant feedback oscillation means and the string system. The sensing and indicating means include digital display means.

In accordance with still further aspects of the invention, the force transmitting means comprises a plurality of levers for transmitting to the string system through an interconnecting means a tension force proportional to the weight and first and second anchors secured to the base member. The interconnecting means is coupled to the second anchor means to transmit the proportional force through the second anchor means to the string system. The second anchor means is secured to the base member in a manner which permits slight relative rotation of the second anchor means about a fixed axis of rotation. The interconnecting means is coupled to the second anchor means such that the force applied to the second anchor means by the interconnecting means biases the second anchor means in a first direction of rotation. The parallel strings are secured to the second anchor means such that the force applied to the second anchor means by the string system biases the second anchor means in a second opposite direction of rotation. Adjustable preload means are coupled to the second anchor means for biasing the second anchor means in the first direction of rotation. The means securing the second anchor means to the base member comprise horizontally and vertically disposed flexible support means for opposing the forces exerted on the second anchor means by the strings and the interconnecting means, respectively. The line of intersection between the horizontal and vertical planes of the flexible support means comprises the axis of rotation of the second anchor means.

BRIEF DESCRIPTION OF THE DRAWINGS

While the novel features of this invention are set forth with particularity in the appended claims, the invention, both as to organization and content, will be better understood and appreciated, along with other objects and features thereof, from the following description taken in connection with the drawings, in which:

DESCRIPTION OF A PREFERRED EMBODIMENT

As illustrated by FIGS. 1, 2, 7 and 8, a household-type weighing scale 10 includes a generally horizontal base member 12 and a generally horizontal platform member 14 positioned vertically above the base member 12. A force transmitting mechanism is interposed between the base member 12 and the platform member 14 for transmitting force therebetween whenever a weight is placed on the upper surface of the platform member 14. The force transmitting mechanism, which will be described in detail as this description proceeds, maintains at all times a slight vertical spacing, as at 18, between all facing portions of the base and platform members so that downwardly directed force applied to the platform 14 can be transmitted from the platform 14 to the base 12 only through the force transmitting mechanism. The scale includes means for sensing the magnitude of the force, or weight, applied to the platform 14 and displaying the applied weight by means of a digital display 16 which may be viewed through an opening 18 in the platform member 14.

Figure 1:
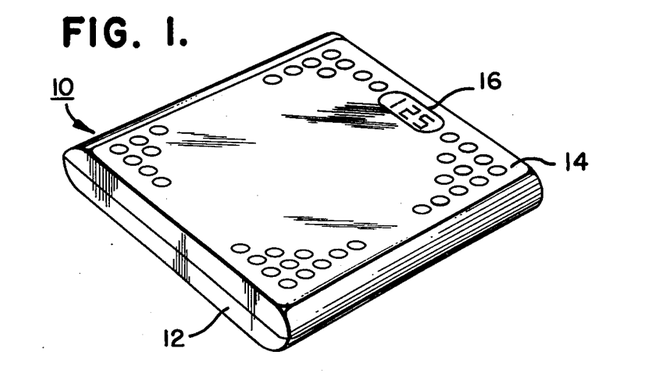
FIG. 1 is a perspective view of a household-type weighing scale incorporating the multi-string weighing system of this invention.
Figure 2:
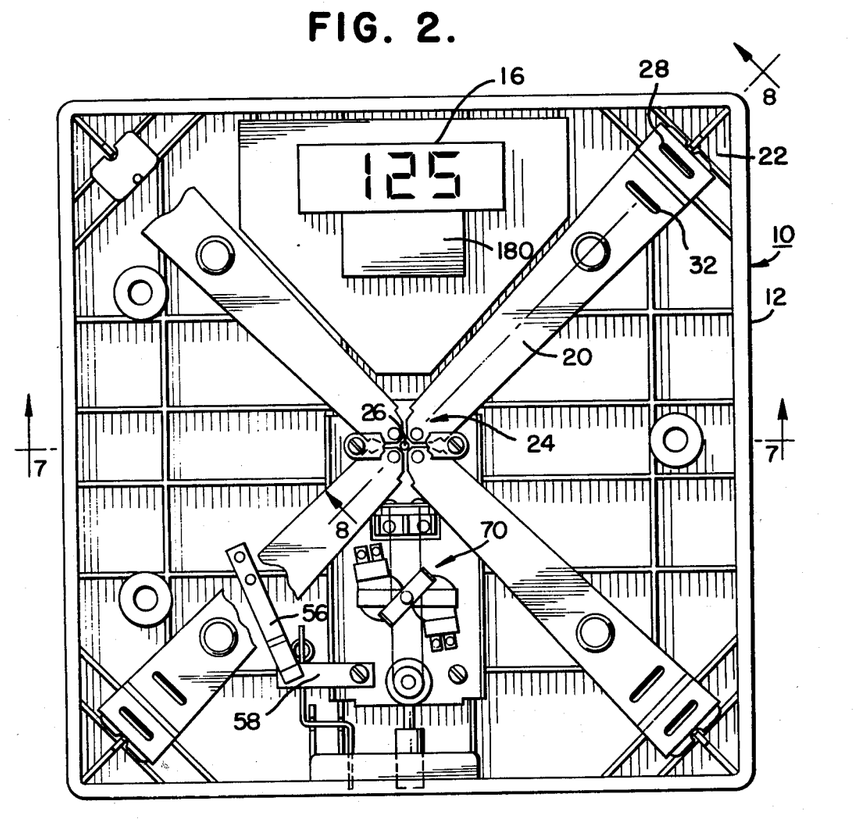
FIG. 2 is a top view of the weighing scale of FIG. 1 with the platform member removed.
Figure 7:
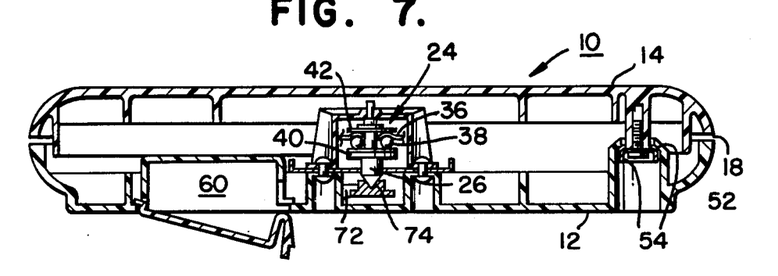
FIG. 7 is a cross-sectional view of the scale taken along viewing line 7—7 of FIG. 2.
Figure 8:
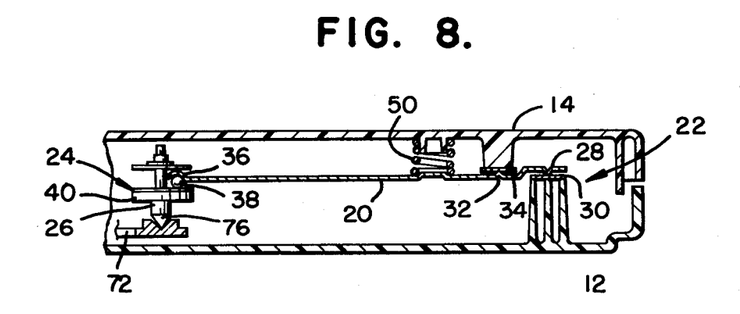
FIG. 8 is a cross-sectional view of a portion of one of the levers and the interconnecting means taken along viewing line 8—8 of FIG. 2.

Referring now to FIGS. 2, 7 and 8, the force transmitting means includes four levers 20 each of which connects a respective corner portion 22 of the scale 10 to a centrally located interconnecting means indicated generally by the numeral 24. The interconnecting means includes a vertically disposed pin 26. At its outer end, each lever 20 has a V-shaped formed bearing surface 28 thereon facing downwardly to rest on a complementary flat bearing surface 30 on the base 12. Spaced inwardly a short distance along the lever 20 is a similar upwardly facing V-shaped bearing surface 32 which contacts a flat bearing surface 34 on the platform 14. At its inner end, the lever 20 has a downwardly facing cup-shaped formed portion 36 which contacts a respective ball 38. The four balls 38 are interposed between the portions 36 of the four respective levers 20 and a thrust bearing member 40 secured to the pin 26. As best shown by FIG. 7, a cage plate 42 is secured to the pin 26 above the balls 38 and the formed lever ends 36 to hold the elements of the interconnecting means 24 in their assembled positions. An appropriate circumferential ring (not shown) surrounds the balls 38 to prevent radial movement out of their assembled positions. The purpose of the balls 38 is to transmit to the thrust bearing member 40 and the pin 26 a summation of the vertically downwardly forces exerted on the balls 38 by the levers 20.

Still referring to FIGS. 2, 7 and 8, a compression spring 50 is provided between each of the levers 20 and the platform 14, the springs 50 being located slightly inwardly of the mating bearing surfaces 32 and 34. The springs 50 bias the platform 14 upwardly relative to the levers 20 and the base 12 and, as hereinafter described, exert a preload force on the weight sensing apparatus. When no weight is applied to the platform 14, the total force exerted by the springs 50 is sufficient to lift the bearing surfaces 34 off of the mating surfaces 32. In this manner, the spacing between the base and platform member, as at 18, is increased to a maximum value established by contact between stop members 52 and 54 carried by, respectively, the base 12 and the platform 14. This added spacing is utilized when a weight is not being applied to the platform 14 to turn off the electrical circuitry of the scale 10. More particularly, as shown by FIG. 2, the electrical circuitry includes a spring steel contact element 56 and a mating contact element 58 located vertically below the contact 56. The spring characteristics of the content element 56 are such that it normally biases itself upwardly in a direction to break contact with element 58. When a weight is not being applied to the scale, the spacing between the base and the platform is sufficient to permit the element 56 to break electric contact with the element 58, thus preventing the flow of electric current from batteries located in a battery compartment 60 shown by FIG. 7. Whenever weight is applied to the platform 14, the force produced by the springs 50 is readily overcome, and the added spacing between the base and platform members provided by the springs 50 is eliminated. This significant reduction in the spacing between the base and platform members results in contact between the underside of the platform 14 and the element 56 and sufficient movement downwardly by the element 56 to contact element 58, thus closing the electric circuit. In this manner, the electric circuit is energized only when a weight is applied to the upper surface of the platform 14. It will thus be seen that the force exerted by the springs 50 must be large enough to lift the platform 14 and de-energize the scale mechanism when no weight is being applied, but small enough to permit the added spacing to be eliminated whenever a weight is placed upon the platform member 14. The spring constant of the springs 50 is such that the springs 50 exert substantially constant forces on the levers 20 at all times.

Figure 3:
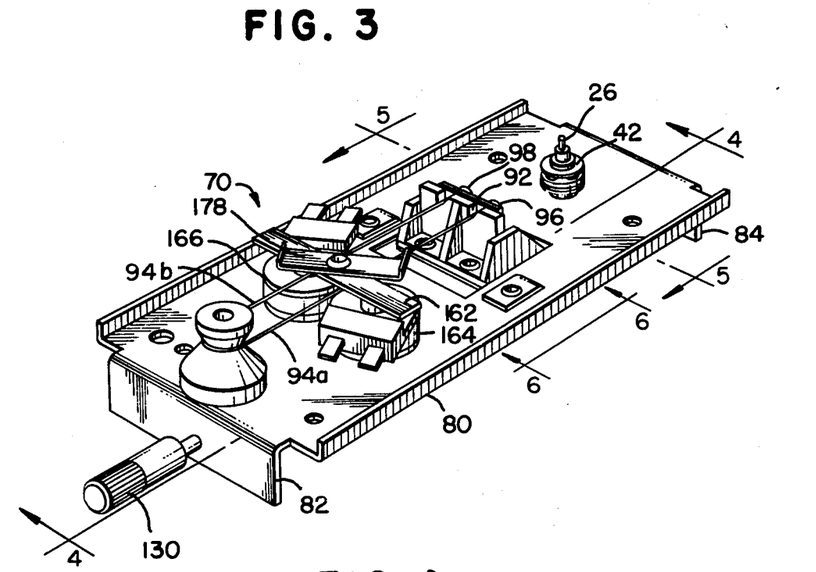
FIG. 3 is a perspective view of the vibrating string system assembly of this invention.
Figure 4:
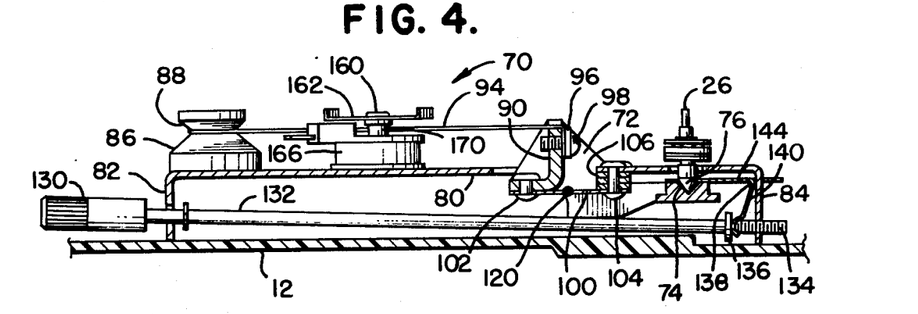
FIG. 4 is a cross-sectional view of the multi-string weighing system taken along viewing line 4—4 of FIG. 3.

The force transmitting means also includes a multi-string force transmitting system indicated generally by the numeral 70 in FIGS. 2, 3, and 4. This multi-string system constitutes the heart of the present invention, but for the moment it will merely be noted that it includes an anchor member 72 having a recessed bearing surface 74 therein which received the pointed lower end 76 of the pin 26. During the weighing process, the pin 26 exerts a downwardly directed force on the anchor member 72, and the anchor member 72 exerts an equal upwardly directed force on the pin 26.

Referring now to FIGS. 2, 7, and 8, the total force applied to the upper face of the platform 14 will be transmitted downwardly through the four bearing surfaces 34 to the bearing surfaces 32 of the levers 20. Normally, the total force will be equally divided between the levers 20, but in the event of an unbalanced loading on the platform, the forces applied to the individual levers 20 may be unequal. Nevertheless, the total force applied to the four bearing surfaces 32 will be equal to the downward force applied to the platform 14. Under loading, each of the levers 20 will assume an equilibrium position in which the total downward force applied to the bearing surface 32 and the lever 20 by the spring 50 is equal to the total of the upward forces exerted on the lever 20 by the bearing surface 30 and the associated ball 38. In addition, the total counterclockwise moment exerted on the lever 20 about the bearing surface 32 by the upward force at bearing surface 30 and the downward force from spring 50 is equal to the clockwise moment exerted on the lever 20 about the bearing surface 32 by the upward force at the ball 38. Since the moment arm between the ball 38 and the bearing surface 32 is much greater than the moment arm between the bearing surfaces 30 and 32 and the force exerted by the spring 50 is relatively slight, the force transmitted through the ball 38 to the pin 26 and the anchor 72 is substantially less than the force at bearing surface 30 and much less than the downward force applied to the bearing surface 32. Since the moment arms are fixed, it will be obvious that the force transmitted to the anchor 72 is a fixed percentage, say fifteen percent (15%), of the downward force applied to the bearing surface 32. Furthermore, since the levers 20 and their supports are substantially identical, the same fixed percentage of the total force applied to the platform 14 will be transmitted through the interconnecting means 24 to the anchor 72. The downward force applied to the anchor 72 is thus related in a predetermined and known manner to the total force applied to the platform 14.

The multi-string force transmitting system 70 of this invention will now be described with initial reference to FIGS. 2 through 6. A formed support member 80 has depending walls 82 and 84 at opposite ends thereof secured to the base member 12 such that the support plate 80 effectively becomes an integral part of the base. A fixed anchor 86 is secured to the base plate 82 adjacent the depending wall 82, the anchor 86 being an upstanding part with a V-shaped circular groove 88 therein. The anchor 72 is flexibly secured to the base plate 80 adjacent the depending wall 84 by a flexible mounting arrangement hereinafter described. The anchor 72 includes an upstanding clamping portion 90 having a pair of V-shaped notches 92 therein, the bottom of the notches 92 and the V-shaped groove 88 of the anchor 86 being spaced-apart and horizontally aligned with each other. The spacing between the notches 92 is substantially equal to the minimum diameter of the groove 88.

A single piece of piano wire 94 or the like is wrapped around the groove 88 of the anchor 86 with the opposite ends of the wire clamped in the grooves 92 by a clamping plate 96 and screws 98. The wire 94 effectively forms a pair of laterally spaced-apart parallel strings 94a and 94b secured at opposite ends thereof to the anchors 72 and 86. The wrapping of the wire 94 around the anchor groove 88 assures that the wire portions 94a and 94b will operate as independent strings each having a free length equal to the distance between the notches 92 and the initial point of contact with the groove 88. In a preferred embodiment of the invention, the free length is approximately 2⅞ inches. Tensile stress in the wire 94 is uniformly distributed between the strings 94a and 94b, however, since the wire 94 is merely looped around the anchor 86. The wire 94 can slip relative to the anchor 86 as needed to equalize stress in the two strings 94a and 94b.

Figure 5:
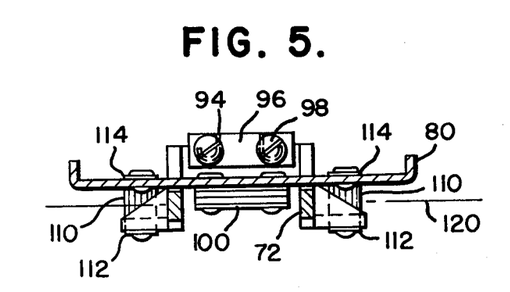
FIG. 5 is a cross-sectional view of the second anchor means taken along viewing line 5—5 of FIG. 3.
Figure 6:
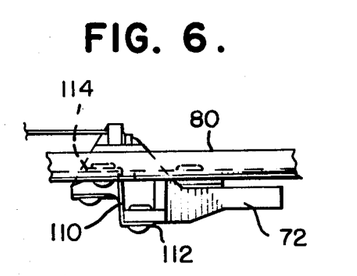
FIG. 6 is a view of the second anchor means taken along viewing line 6—6 of FIG. 3.

As best shown by FIGS. 4–6, the anchor 72 is secured to the base plate 80 by a thin flexible plate 100 disposed in a horizontal plane extending between attachment points 102 and 104 on the anchor 72 and the base plate 80 respectively. Spacers 106 are located between the base plate 80 and the flexible plate 100 to assure that the plate 100 is located in a generally horizontal plane. The point of engagement between the recessed bearing surface 74 of the anchor 22 and the pointed end 76 of the pin 267 is located in the plane of the flexible plate 100. The primary function of the flexible plate 100 is to produce a substantially horizontal force on the anchor 72 that is equal to and oppositely directed to the force exerted on the anchor 72 by the strings 94a and 94b. Similarly, a pair of thin webs 110 extend in a generally vertical plane between attachment points 112 and 114 on the anchor 72 and the base plate 80, respectively. The points of attachment of the strings 94a and 94b also lie within the vertical plane defined by the thin webs 110. The primary function of the webs 110 is to produce a substantially vertical force on the anchor 72 that is equal to and oppositely directed to the force exerted on the anchor 72 by the pin 26. The planes of the plate 100 and the webs 110 intersect on a line 120 as best shown by FIGS. 5 and 6. This line is, of course, in both of the planes, and it forms an axis of rotation for the anchor 72.

As described to this point, the anchor 72 has four forces acting upon it. The strings 94a and 94b exert, as best shown by FIG. 4, forces directed horizontally to the left. The total force of the strings 94a and 94b acts along a line offset vertically from the line 120 so as to exert a counterclockwise moment on the anchor 72. The opposing force exerted on the anchor 72 by the plate 100 passes through the pivot line 120 and thus produces no turning moment on the anchor 72. The pin 26 produces a vertically downward force on the bearing surface 74 along a line offset horizontally from the line 120 so as to exert a clockwise moment on the anchor 72. The opposing force exerted on the anchor 72 by the webs 110 passes through the pivot line 120 and thus does not produce a turning moment on the anchor 72.

In actual practice, the anchor 72 has preload forces applied thereto for the purpose of producing an initial tensile stress level in the strings 94a and 94b. More particularly, as best shown by FIGS. 3 and 4, an adjusting knob 130 accessible from the exterior of the base member 12 is secured to an elongated shaft 132 having a threaded end portion 134 received in a threaded portion of the depending wall 84. The shaft 132 has a shoulder 136 fixed thereto adjacent the wall 84, and a force-transmitting spring steel member 138 is captured between the shoulder 136 and the wall 84. The member 138 includes a first portion 140 which extends upwardly from the shaft 132 for a short distance, at which point it is bent into a generally horizontal portion 144 having its distal end contacting the upper surface of the anchor 72 adjacent the bearing surface 74. The included angle between the portions is less than 90° such that there is significant spacing between the lower end of the portion 140 and the wall 84 when a preload force is not being applied, as in FIG. 4. When the knob 130 is turned in a clockwise direction, the threaded portion 134 of the shaft advances toward the wall 84 as viewed in FIG. 4, and the shoulder 136 forces the portion 140 of the member 138 toward the wall 84, thereby causing the distal end of the portion 144 to exert a downwardly directed force on the anchor 72. In addition, the downward force exerted on the levers 20 by the compression springs 50 (FIG. 8) causes the pin 26 to exert an additional downward force on the bearing surface 74 of the anchor 72. These forces are opposed by a directly proportional tension force created in the strings 94a and 94b. Through adjustment of the knob 130, the total amount of preload force on the anchor 72 can be varied to adjust the amount of preload tensile stress in the strings 94a and 94b. As described hereinafter, a predetermined tensile load on the strings 94a and 94b corresponds to a zero applied weight; the knob 130 can be manually adjusted to provide the required zero-setting preload force on the strings 94a and 94b.

When no weight is being applied to the platform 14, the clockwise moment exerted on the anchor 72 by the member 138 of the preload adjusting mechanism and the springs 50 acting through the pin 26 is opposed by an equal counterclockwise moment exerted on the anchor 72 by the springs 94a and 94b. When a weight is thereafter applied to the platform 14, an additional force directly proportional to the weight is transmitted to the anchor 72 through the pin 26. This produces an added clockwise moment on the anchor 72 biasing the anchor about the axis 120 in a clockwise direction. The additional weight-related force produced on the anchor 72 by the pin 26 is, however, opposed by a directly proportional increase in the total force exacted on the anchor 72 by the strings 94a and 94b. More particularly, the anchor 72 assumes an equilibrium position in which the counterclockwise moment produced by the strings 94a and 94b is balanced by the sum of the movements produced on the anchor 72 by the pin 26 and the preload member 138. Since there is essentially no change in the forces applied to the anchor 72 by the preload member 138 and the springs 50 with changes in weight applied to the platform 14, the increase in the moment produced by the strings 94a and 94b is substantially equal to the moment produced by the applied weight acting through the pin 26. Because of the fixed moment arms, a weight applied to the platform 14 thus causes a directly proportional increase in the tension force exerted on the anchor by the strings 94a and 94b. Stated differently, the tension force applied to the strings 94a and 94b increases by an amount directly proportional to the weight applied to the platform 14. The present invention provides means for sensing and indicating the change in tension and, consequently, the vertical force applied to the platform 14 by a weight placed thereon.

It is a well-known principle that the natural, or resonant, frequency of a stressed string is related to the tensile stress of the string. The natural frequency increases with increases in the tension force on the string. It has therefore been long appreciated that the natural frequency of a string stressed in tension could be used to determine the force producing the tension. It has been recognized that such systems could be used to detect the magnitude of a weight placed on a scale.

Heretofore, vibrating string scale systems have utilized one or more strings, each of which vibrates as an individual member to indicate a change in the applied force, or weight, or some other parameter such as the zero weight level. The known prior art single string arrangements are characterized by a relatively small change in the natural frequency per unit of applied weight. A relatively large change in weight is required to produce a relatively small change in natural frequency in such systems. Moreover, a single vibrating string will normally vibrate not only at its resonant frequency, but also at various harmonic frequencies. The sensing system used with such systems must, therefore, be extremely sensitive and selective to sense relatively small changes in the natural frequency while rejecting the effects caused by harmonic frequencies.

The present invention overcomes these problems in large measure by providing a relatively large change in the natural frequency per unit of applied weight. In the present invention, a given change in weight produces a relatively large change in natural frequency. In addition, the multi-string arrangement of the present invention is largely constrained to vibrate in only one mode and at only its natural frequency. As a result, the sensing system does not require extreme sensitivity and selectivity for accurate operation.

As illustrated by FIGS. 2-4 and 9, the parallel strings 94a and 94b are laterally spaced-apart by a distance established by the diameter of the groove 88 and the spacing between the notches 92. While the lateral spacing may be relatively small on an absolute scale, say $\frac{3}{8}$ inch, the spacing is large relatively to the thickness of the individual strings. At their longitudinal center, the strings 94a and 94b are clamped together at 160 by a cross member 162, which extends transversely of the strings across the tops of a pair of coils 164 and 166 located on opposite sides of the strings. A pair of permanent magnets 170 and 171 each depend from an end of the cross member 162 in alignment with the core of the respective coil 164 and 166. One of the magnets has its south pole adjacent the respective coil while the other magnet has its north pole adjacent the respective coil. The coils 164 and 166 are coupled by appropriate connections (not shown) to the scale control circuitry indicated at 180. The circuitry 180 includes electronic components which together with the coils 164 and 166 comprise a resonant feedback oscillator having one of the coils in the input circuit and the other coil in the output circuit.

Under the influence of the control circuitry 180, the multi-string unit comprising the strings 94a and 94b, the cross member 162, and the magnets 170 will be driven by the oscillator circuitry in a torsional mode about an axis centered between the strings with the magnets 170 alternately approaching and retreating from the associated coils 164 and 166. The feedback circuitry of the scale will cause the multi-string unit to vibrate at a resonant or natural frequency established by the physical characteristics of the system, including the total tension force on the strings 94a and 94b, the physical characteristics of the wire 94 such as material, construction, etc., the spacing between the strings 94a and 94b, the length of the strings 94a and 94b, and the moment of inertia of the system as determined primarily by the cross member 162 and the magnets 170. An adjusting bar 178 is provided in order to adjust the moment of inertia. At the time of manufacture, the bar 178 may be adjusted to establish a desired natural frequency at a given preload force on the strings. In a preferred embodiment of the invention, the preload force (zero setting) is approximately six pounds, and the zero setting frequency is approximately 131.84 Hz. Thereafter, all physical characteristics of the system, except applied force, will remain substantially fixed. As a result, changes in the natural frequency are applicable only to changes in the applied tension force.

Figure 9:
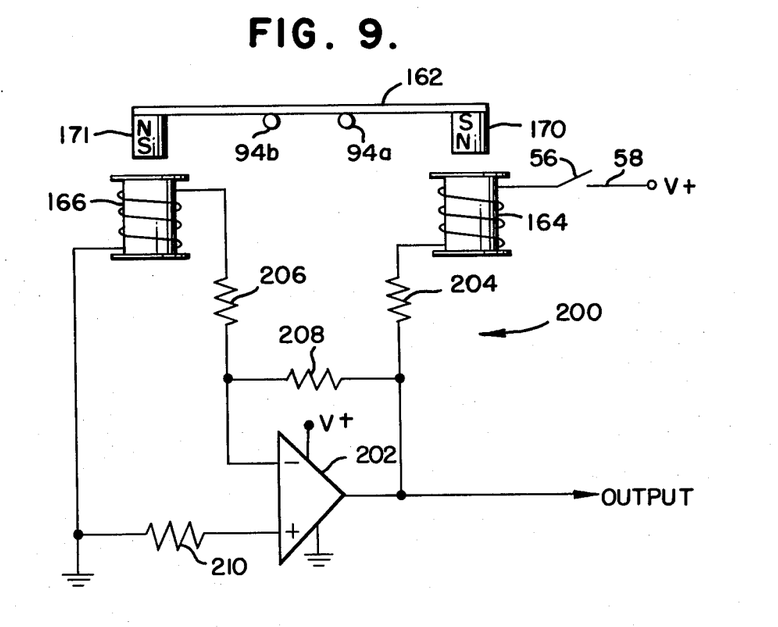
FIG. 9 is a schematic view of the means for driving the multi-string system at its natural or resonant frequency.

A preferred resonant feedback oscillator 200 will now be described with reference to FIG. 9. The magnet 170 is mounted on the cross member 162 with its north pole adjacent the coil 164, the drive or input coil, and the magnet 171 is mounted on the cross member 162 with its south pole adjacent the coil 166, the pickup or output coil. The coil 164 is connected through the switch elements 56 and 58 (FIG. 2) to the source of dc electric power V+ such that a positive voltage is applied to the upper end of coil 164 when a weight is applied to the scale, closing contacts 56 and 58 (FIG. 2). The positive voltage applied to the coil 164 causes the magnet 170 to be repelled and the cross member 162 to be rotated in a counterclockwise direction. As a result, the magnet 171 approaches the coil 166, inducing a positive voltage therein at the upper end of the coil 166. A positive voltage is thus supplied to the inverting input of an operational amplifier 202, which in turn produces a low output signal.

As the cross member 162 rotates in the counterclockwise direction, potential energy is stored in the multi-string unit. The stored energy eventually reaches a level sufficient to reverse the direction of rotation of the cross member 162. When this occurs, the direction of the induced voltage in each of the coils also reverses, and a negative voltage is supplied to the inverting input of the operational amplifier 202. As a result, a high output signal is produced at the output of the operational amplifier 202. In practice, the multi-string unit will oscillate at its natural or resonant frequency, and the output signal from the operational amplifier 202 wll also oscillate at the resonant frequency.

In a preferred embodiment of the invention, the operational amplifier 202 is provided by an LM324 integrated circuit available from National Semiconductor Corporation, and the circuit resistors 204, 206, 208, and 210 have respective resistance values of 2.7K, 5.1K, 3.3 M, and 5.1K ohms.

The electronic circuitry 180 also includes means for sensing the frequency of oscillation and converting the sensed frequency into a signal driving the digital display 16. Various forms of microprocessing circuitry are well-known in the art for accomplishing this function. The relationship between the applied weight and the sensed frequency will vary from scale to scale depending upon the selected physical characteristics of the multi-string system and the other parts of the scale. In a preferred embodiment of the invention, it was found that the actual weight was substantially given by:

$$W = Af^2 + Cf^3 - B$$

where:

W is the applied weight; f is the natural frequency; and

A, B and C are physical constants where $A = 5.03 \times 10^{-3}$ $B = 98.2$ $C = 4.7 \times 10^{-6}$.

When the zero-setting frequency is 132 Hz, the applied weight calculated from the formula is zero. For a sensed frequently of 253 Hz, for example, the applied weight will be seen to be 300 pounds. A practical frequency range of 132 to 253 Hz corresponds to an effective weight range of zero to 300 pounds. Other relationships between weight and frequency may be provided in systems having different physical characteristics. In each such arrangement, the microprocessor would have to be programmed to convert the sensed frequency changes into a weight indication in accordance with the proper mathematical expression of the relationship between weight and frequency. For example, the period of the output frequency of the operational amplifier 202 can be sensed and combined with a curve derived from the above or other appropriate formula to provide an indication of the applied weight.

The multi-string arrangement of this invention has a number of distinct advantages. As indicated previously, the unit tends to oscillate only in the torsional mode and only at the natural frequency. Moreover, the multi-string unit is characterized by a relatively large change in frequency per unit change in weight. These characteristics enable the scale to provide an accurate indication of applied weight.

While the invention has been particularly shown and described with reference to a preferred embodiment thereof, it will be understood by those skilled in the art that various changes in form, detail, and application may be made therein without departure from the spirit and scope of the invention. For example, the string system is not limited to a two-string system; any number of parallel strings could be used. Other arrangements could be used to drive the multi-string unit at its resonant frequency, and an analog system could be used to display the sensed weight. The flexible plate-mounted anchor 72 could be replaced by equivalent means for transmitting a force proportional to weight to the strings. Many other modifications will be obvious to those skilled in the art. Accordingly, it is intended that all such modifications and changes be included within the scope of the appended claims.

What is claimed as new and is desired to secure by Letters Patent of the United States is:

1. A weighing scale apparatus comprising:
   a generally horizontal base member,
   a generally horizontal platform member over-lying said base member in vertically spaced-apart relationship therewith,
   force transmitting means interposed between said base and platform members for transmitting force therebetween in response to a vertically downwardly directed force applied to said platform member,
   said force transmitting means including a string system comprising at least two laterally spaced-apart parallel strings stressed substantially uniformly in tension whenever a vertically downwardly directed force is applied to said platform member, the tension force applied to said string system being related in a known manner to the magnitude of the vertical force applied to said platform member, and
   means coupled to said string system for causing said string system to vibrate at its natural frequency and for detecting said natural frequency and producing an output signal related thereto and to the magnitude of the vertical force applied to said platform member.

2. A weighing scale apparatus as defined by claim 1 in which said means for causing said string system to vibrate at its natural frequency and said means for detecting said natural frequency and producing an output signal proportional thereto comprise:
   magnetic means secured to said string system for movement therewith during vibration of said wire,
   a resonant feedback oscillator having first and second coils in its input and output circuits, said first and second coils being coupled to each other and said magnetic means in a manner such that the resonant feedback oscillator drives said string system and oscillates at the natural frequency of said string system, and
   means for sensing the frequency of oscillation of said resonant feedback oscillator.

3. A weighing scale apparatus as defined by claim 1 in which said means for sensing and indicating the magnitude of the force applied to said platform member includes digital display and conversion means for converting the natural frequency output signal into a digital display of the magnitude of the force applied to said platform member.

4. A weighing scale apparatus as defined by claim 1 further comprising selectively adjustable means for changing the natural frequency of vibration of said string system in response to a fixed vertical force applied to said platform member, whereby the output signal produced in response to a fixed vertical force may be selectively varied.

5. A weighing scale apparatus as defined by claim 4 in which said adjustable means comprises means for adjusting the physical characteristics of said string system.

6. A weighing scale apparatus as defined by claim 4 in which said adjustable means comprises means for selectively preloading said string system.

7. A weighing scale apparatus as defined by claim 1 in which said force transmitting means further comprises:
a plurality of levers each having bearing surfaces thereon mating with complementary bearing surfaces on said platform and base members, said plurality of levers transmitting directly through said bearing surfaces to said base member a predetermined portion of the vertically downwardly directed force applied to said platform member, and
means interconnecting said plurality of levers and coupling said plurality of levers to said string system, said interconnecting means transmitting to said string system a tension force related in a known manner to the vertically downwardly directed force applied to said platform member.

8. A weighing scale apparatus as defined by claim 7 in which said force transmitting means further comprises:
a first anchor means secured to said base member in a fixed position relative thereto,
a second anchor means, and
means securing said second anchor means to said base member in a generally fixed position spaced-apart from said first anchor means,
said laterally spaced-apart parallel strings being secured at opposite ends thereof to, and stressed in tension between, said first and second anchor means, and said interconnecting means being coupled to said second anchor means to transmit through said second anchor means to said strings said related tension force.

9. A weighing scale apparatus as defined by claim 8 further comprising means securing said second anchor means to said base member in a manner which permits relative rotation of said second anchor means about a fixed axis of rotation, said inter-connecting means being coupled to said second anchor means such that the force applied to said second anchor means by said interconnecting means biases said second anchor means in a first direction of rotation about said axis of rotation, and said parallel strings being secured to said second anchor means such that the tension force applied to said second anchor means by said parallel strings biases said second anchor means in a second direction of rotation about said axis of rotation.

10. A weighing scale apparatus as defined by claim 9 further comprising preload means coupled to said second anchor means for biasing said second anchor means in said first direction of rotation, the moments applied to said second anchor means by said interconnecting means and said preload means balancing the moment applied to said second anchor means by said parallel strings.

11. A weighing scale apparatus as defined by claim 10 in which said preload means is adjustable so as to vary the preload moment applied to said second anchor means.

12. A weighing scale apparatus as defined by claim 11 in which said means for causing said string system to vibrate at its natural frequency and said means for detecting said natural frequency and producing an output signal proportional thereto comprise:
magnetic means secured to said string system for movement therewith during vibration of said wire,
a resonant feedback oscillator having first and second coils in its input and output circuits, said first and second coils being coupled to each other and said magnetic means in a manner such that the resonant feedback oscillator drives said string system and oscillates at the natural frequency of said string system, and
means for sensing the frequency of oscillation of said resonant feedback oscillator.

13. A weighing scale apparatus as defined by claim 11 in which said means for sensing and indicating the magnitude of the force applied to said platform member includes digital display and conversion means for converting the natural frequency output signal into a digital display of the magnitude of the force applied to said platform member.

14. A weighing scale apparatus as defined by claim 9 in which said means securing said second anchor means to said base member further comprises:
first flexible support means disposed in a generally horizontal plane and connecting said second anchor means and said base member,
said first flexible support means and said parallel strings being relatively positioned to exert oppositely directed substantially horizontal forces on said second anchor means with the horizontal force exerted by said first flexible support means being located in the horizontal plane of said first flexible support means, and
second flexible support means disposed in a generally vertical plane and connecting said second anchor means and said base member,
said second flexible support means and said interconnecting means being relatively positioned to exert oppositely directed substantially vertical forces on said second anchor means with the vertical force exerted by said second flexible support means being located in the horizontal plane of said first flexible support means, and
said fixed axis of rotation being established by the line of intersection of the respective horizontal and vertical planes of said first and second flexible support means such that the forces exerted on said second anchor means by said first and second flexible support means produces substantially no moment on said second anchor means about said fixed axis of rotation.

15. A weighing scale apparatus as defined by claim 14 further comprising selectively adjustable means for changing the physical characteristics of said string system so as to thereby vary the natural frequency of vibration of said string system in response to a fixed vertical force applied to said platform member, whereby the output signal produced in response to a fixed vertical force may be selectively varied.

16. A weighing scale apparatus as defined by claim 14 further comprising preload means coupled to said second anchor means for biasing said second anchor means in said first direction of rotation, the moments applied to said second anchor means by said interconnecting means and said preload means balancing the moment applied to said second anchor means by said parallel strings.

17. A weighing scale apparatus as defined by claim 16 in which said preload means is adjustable so as to vary the preload moment applied to said second anchor means.

18. A weighing scale apparatus as defined by claim 17 in which said means for causing said string system to vibrate at its natural frequency and said means for detecting said natural frequency and producing an output signal proportional thereto comprise:

magnetic means secured to said string system for movement therewith during vibration of said wire, a resonant feedback oscillator having first and second coils in its input and output circuits, said first and second coils being coupled to each other and said magnetic means in a manner such that the resonant feedback oscillator drives said string system and oscillates at the natural frequency of said string system, and means for sensing the frequency of oscillation of said resonant feedback oscillator.

19. A weighing scale apparatus as defined by claim 18 in which said means for sensing and indicating the magnitude of the force applied to said platform member includes digital display and conversion means for converting the natural frequency output signal into a digital display of the magnitude of the force applied to said platform member.

* * * * *